US009826338B2

(12) United States Patent
Pal

(10) Patent No.: US 9,826,338 B2
(45) Date of Patent: Nov. 21, 2017

(54) IOT-ENABLED PROCESS CONTROL AND PREDECTIVE MAINTENANCE USING MACHINE WEARABLES

(71) Applicant: Prophecy Sensors, LLC, Baltimore, MD (US)

(72) Inventor: Biplab Pal, Ellicott City, MD (US)

(73) Assignee: Prophecy Sensorlytics LLC, Baltimore, MD (US)

( * ) Notice: Subject to any disclaimer, the term of this patent is extended or adjusted under 35 U.S.C. 154(b) by 330 days.

(21) Appl. No.: 14/599,461

(22) Filed: Jan. 17, 2015

(65) Prior Publication Data

US 2016/0209831 A1    Jul. 21, 2016

(51) Int. Cl.
*H04W 4/00* (2009.01)
*G05B 19/418* (2006.01)

(52) U.S. Cl.
CPC ........ *H04W 4/008* (2013.01); *G05B 19/4185* (2013.01); *G05B 2219/31457* (2013.01); *Y02P 90/18* (2015.11)

(58) Field of Classification Search
CPC .............. H04W 4/008; G05B 19/4185; G05B 2219/31457
See application file for complete search history.

(56) References Cited

U.S. PATENT DOCUMENTS

| 5,150,289 A | 9/1992 | Badavas |
| 5,487,225 A | 1/1996 | Downie |
| 5,610,339 A | 3/1997 | Haseley et al. |
| 5,825,338 A | 10/1998 | Salmon et al. |
| 5,995,561 A | 11/1999 | Yamasaki et al. |

(Continued)

FOREIGN PATENT DOCUMENTS

| CN | 201672991 | 12/2010 |
| CN | 102539911 A | 7/2012 |

(Continued)

OTHER PUBLICATIONS

International Search Report and Written Opinion for PCT Application No. PCT/US16/18820; dated Aug. 4, 2016.

(Continued)

*Primary Examiner* — Dennis M Butler
(74) *Attorney, Agent, or Firm* — Fox Rothschild LLP

(57) ABSTRACT

Disclosed is an IoT-based system for overseeing process control and predictive maintenance of a machine or a network of machines by employing machine wearable sensors. The system comprises a plurality of IR temperature sensors, each of which secured to the exterior of the machine; each IR sensor capable of transmitting captured temperature data wirelessly over a communications network, an algorithm engine capable of receiving data from the IR sensors, the algorithm engine for further processing the received data to recognize real-time temperature patterns, deviations, etc., and based on the same issuing control commands pertaining to the machine, and one or more control modules disposed in operative communication with the control panel of the machine, the control module capable of receiving, over a communications network, the control commands and executing the same resulting in accomplishing process control or predictive maintenance of the machine or both.

9 Claims, 7 Drawing Sheets

(56) References Cited

U.S. PATENT DOCUMENTS

| | | |
|---|---|---|
| 6,289,606 B2 | 9/2001 | Gillette et al. |
| 6,405,108 B1 | 6/2002 | Patel et al. |
| 7,406,399 B2 | 7/2008 | Furem et al. |
| 7,882,394 B2 | 2/2011 | Hosek et al. |
| 7,938,935 B2 | 5/2011 | Machattie et al. |
| 8,021,462 B2 | 9/2011 | Moretto |
| 8,112,381 B2 | 2/2012 | Yuan et al. |
| 8,126,574 B2 | 2/2012 | Discenzo et al. |
| 8,150,340 B2 | 4/2012 | Albsmeier et al. |
| 8,390,299 B2 | 3/2013 | Laepple et al. |
| 8,405,940 B2 | 3/2013 | Schweitzer, III et al. |
| 8,433,443 B2 | 4/2013 | Hagerty et al. |
| 8,560,368 B1 | 10/2013 | Maity et al. |
| 8,571,904 B2 | 10/2013 | Guru et al. |
| 8,726,535 B2 | 5/2014 | Garrido et al. |
| 8,868,242 B2 | 10/2014 | Loutfi |
| 8,920,078 B2 | 12/2014 | Woolever |
| 9,052,216 B2 | 6/2015 | Kamel et al. |
| 9,062,536 B2 | 6/2015 | Fischer |
| 2002/0143421 A1 | 10/2002 | Wetzer |
| 2004/0199573 A1 | 10/2004 | Schwartz et al. |
| 2006/0168195 A1 | 7/2006 | Maturana et al. |
| 2006/0208169 A1 | 9/2006 | Breed et al. |
| 2006/0276949 A1 | 12/2006 | Beck et al. |
| 2007/0100518 A1 | 5/2007 | Cooper |
| 2007/0193056 A1 | 8/2007 | Switalski |
| 2008/0109185 A1 | 5/2008 | Cheung et al. |
| 2008/0289045 A1 | 11/2008 | Fryer |
| 2009/0024359 A1* | 1/2009 | Bibelhausen ...... G05B 19/4183 702/188 |
| 2009/0043518 A1 | 2/2009 | Roh et al. |
| 2009/0119243 A1 | 5/2009 | Yuan et al. |
| 2010/0169030 A1 | 7/2010 | Parlos |
| 2010/0199352 A1 | 8/2010 | Hill et al. |
| 2010/0295692 A1 | 11/2010 | Bjorn |
| 2011/0016199 A1 | 1/2011 | De Carlo et al. |
| 2011/0131398 A1 | 6/2011 | Chaturvedi et al. |
| 2011/0137697 A1 | 6/2011 | Yedatore et al. |
| 2011/0216805 A1* | 9/2011 | Fernando ............... G01N 33/15 374/121 |
| 2012/0045068 A1 | 2/2012 | Kim et al. |
| 2012/0209569 A1 | 8/2012 | Becourt et al. |
| 2012/0213098 A1 | 8/2012 | Sun |
| 2012/0271576 A1 | 10/2012 | Kamel |
| 2012/0290104 A1 | 11/2012 | Holt et al. |
| 2012/0330499 A1 | 12/2012 | Scheid et al. |
| 2012/0330614 A1 | 12/2012 | Kar |
| 2013/0102284 A1 | 4/2013 | Storozuk |
| 2013/0170417 A1 | 7/2013 | Thomas et al. |
| 2013/0173178 A1 | 7/2013 | Poczka et al. |
| 2013/0201316 A1 | 8/2013 | Binder et al. |
| 2013/0268469 A1 | 10/2013 | Sharma et al. |
| 2013/0287060 A1* | 10/2013 | Langdoc ............... G01J 5/0003 374/121 |
| 2013/0304677 A1 | 11/2013 | Gupta et al. |
| 2013/0318022 A1 | 11/2013 | Yadav et al. |
| 2014/0129164 A1 | 5/2014 | Gorbold |
| 2014/0163416 A1 | 6/2014 | Shuck |
| 2014/0207394 A1 | 7/2014 | Madden |
| 2014/0223767 A1 | 8/2014 | Arno |
| 2014/0244836 A1 | 8/2014 | Goel et al. |
| 2014/0262130 A1 | 9/2014 | Yenni |
| 2014/0309805 A1 | 10/2014 | Ricci |
| 2014/0314284 A1 | 10/2014 | Movellan et al. |
| 2014/0335480 A1 | 11/2014 | Asenjo et al. |
| 2014/0336791 A1 | 11/2014 | Asenjo et al. |
| 2014/0337429 A1 | 11/2014 | Asenjo et al. |
| 2015/0026044 A1 | 1/2015 | Refaeli |
| 2015/0039250 A1 | 2/2015 | Rank |
| 2015/0094914 A1 | 4/2015 | Abreu |
| 2015/0139817 A1 | 5/2015 | Kowalski |
| 2015/0181313 A1* | 6/2015 | Murphy ................ H04Q 9/00 340/870.02 |
| 2015/0185251 A1 | 7/2015 | Heydron et al. |
| 2016/0086285 A1 | 3/2016 | Jordan Peters et al. |
| 2016/0189440 A1 | 6/2016 | Cattone |
| 2016/0245279 A1 | 8/2016 | Pal et al. |
| 2016/0245686 A1 | 8/2016 | Pal et al. |
| 2016/0245765 A1 | 8/2016 | Pal |
| 2016/0291552 A1 | 10/2016 | Pal et al. |
| 2016/0299183 A1 | 10/2016 | Lee |
| 2016/0313216 A1 | 10/2016 | Pal et al. |
| 2016/0349305 A1 | 12/2016 | Pal |
| 2017/0061608 A1 | 3/2017 | Kim et al. |

FOREIGN PATENT DOCUMENTS

| | | |
|---|---|---|
| CN | 103399486 A | 11/2013 |
| CN | 203362223 U | 12/2013 |
| CN | 203588054 U | 5/2014 |
| CN | 104036614 A | 9/2014 |
| EP | 1836576 B1 | 2/2012 |
| EP | 2186613 B1 | 5/2013 |
| EP | 2648393 A1 | 10/2013 |
| WO | WO 2005/086760 A2 | 9/2005 |
| WO | WO 2010/104735 A1 | 9/2010 |
| WO | WO 2013/040855 A1 | 3/2013 |
| WO | WO 2013/093942 A2 | 6/2013 |
| WO | WO 2014/044906 A1 | 3/2014 |
| WO | WO 2014/085648 A1 | 6/2014 |
| WO | WO 2014/089567 A2 | 6/2014 |
| WO | WO 2014/117245 A1 | 8/2014 |
| WO | WO 2015/022036 A1 | 2/2015 |
| WO | WO 2016/137848 A1 | 9/2016 |

OTHER PUBLICATIONS

International Search Report and Written Opinion for PCT Application No. PCT/US15/066547; dated Mar. 17, 2016.
Sensors Drive Mobile IoT; Wong, William; Jan. 26, 2015; Electronic Design.
International Search Report and Written Opinion for PCT Application No. PCT/US16/028724; dated Aug. 22, 2016.
International Search Report and Written Opinion for PCT Application No. PCT/US16/18831; dated Aug. 12, 2016.
Continuous Hidden Markov Model Based Gear Fault Diagnosis and Incipient Fault Detection by Jian-She Kang, et al., dated Jun. 2011, published by Institute of Electrical and Electronics Engineers (IEEE).
Study on Fault Diagnosis of Gear with Spall using Ferrography and Vibration Analysis by Wei Feng, et al., published in Aug. 2009 at the International Conference on Measuring Technology and Mechatronics Automation.
Detection of Generalized-Roughness Bearing Fault by Spectral-Kurtosis Energy of Vibration or Current Signals by Fabio Immovilli, et al., IEEE Transations on Industrial Electronics, vol. 56, No. 11, Nov. 2009.
Intrinsic Mode Function Determination of Faulty Rolling Element Bearing Based on Kurtosis by Wei Kang, et al., Proceeding of the 2015 IEEE International Conference on Information and Automation, Lijiang, China, Aug. 2015.
Condition Monitoring and Fault Diagnosis of Rolling Element Bearings Based on Wavelet Energy Entropy and SOM by Shuai Shi, et al., dated Aug. 2012, published by IEEE.
Fault Diagnosis of Bearing Based on Fuzzy Support Vector Machine, by Haodong Ma, et al., dated Jan. 2015, published by IEEE.
Investigation of the Mechanical Faults Classification using Support Vector Machine Approach by Zhiqiang Jiang, et al., dated Aug. 2010, 2010 Second International Conference on Intelligent Human-Machine Systems and Cybernetics.
Impact Characterization of Multiple-Points-Defect on Machine Fault Diagnosis by Muhammad F. Yaqub, et al., 8th IEEE International Conference on Automation Science and Engineering, Aug. 20-24, 2012, Seoul, Korea.
Detection of Precursor Wear Debris in Lubrication Systems by Jack Edmonds, et al., dated May 2000, published by IEEE.
A Diagnostic Expert System Embedded in a Portable Vibration Analysis Instrument by Dr. Robert Milne, et al., dated May 13, 1991, published at IEE Colloquium on Intelligent Instrumentation.

(56) References Cited

OTHER PUBLICATIONS

Fault Diagnosis Method Study in Roller Bearing Based on Wavelet Transform and Stacked Auto-encoder, by Junbo Tan, et al., dated Feb. 2015, published by IEEE.

Fault Monitoring and Diagnosis of Induction Machines Based on Harmonic Wavelet Transform and Wavelet neural Network by Qianjin Guo, et al., dated Sep. 2008, published at the Fourth International Conference on Natural Computation.

Fault Detection in Kerman Combined Cycle Power Plant Boilers by Means of Support Vector Machine Classifier Algorithms and PCA by M. Berahman, et al., 3rd International Conference on Control, Instrumentation, and Automation (ICCIA 2013), Dec. 28-30, 2013, Tehran, Iran.

International Search Report and Written Opinion for PCT Application No. PCT/US2016/067814; dated Apr. 6, 2017.

International Search Report and Written Opinion for PCT Application No. PCT/US2016/067546; dated Apr. 11, 2017.

\* cited by examiner

IOT-ENABLED PROCESS CONTROL AND PREDECTIVE MAINTENANCE USING MACHINE WEARABLES

CROSS-REFERENCE TO RELATED APPLICATION

This application claims benefit of priority of U.S. Provisional Patent Application Ser. No. 62/081,186, filed Nov. 18, 2014, entitled " PORTABLE INFRARED TEMPERATURE SENSING DEVICE FOR DRYER AND OTHER DEVICES AS MACHINE WEARABLE", owned by the assignee of the present application and herein incorporated by reference in its entirety.

BACKGROUND

Field of the Invention

The present invention relates to Internet of Things (IoT), more particularly, to Machine to Machine (M2M) IoT, and even more particularly to an IoT-based system for administering process control and predictive maintenance of machines, such as, dryers, pumps, motors, boilers, etc., using "machine wearables".

Internet of Things is a network of uniquely-identifiable, purposed "things" that are enabled to communicate data pertaining thereto, therebetween over a communications network whereby, the communicated data form a basis for manipulating the operation of the "things". The "thing" in the Internet of Things could virtually be anything that fits into a common purpose thereof For example, a "thing" could be a person with a heart rate monitor implant, a farm animal with a biochip transponder, an automobile that has built-in sensors to alert its driver when tire pressure is low, or the like, or any other natural or man-made entity that can be assigned a unique IP address and provided with the ability to transfer data over a network. Notably, if all the entities in an IoT are machines, then the IoT is referred to as a Machine to Machine (M2M) IoT or simply, as mentioned earlier, an M2M IoT.

It is apparent from the aforementioned examples that an entity becomes a "thing" of an M2M IoT especially, when the entity is attached with one or more sensors capable of capturing one or more types of data pertaining thereto: segregating the data (if applicable); selectively communicating each segregation of data to one or more fellow "things"; receiving one or more control commands (or instructions) from one or more fellow "things" wherein, the one or more control commands is based on the data received by the one or more fellow "things"; and executing one or more commands resulting in the manipulation or "management" of the operation of the corresponding entity. Therefore, in an IoT-enabled system, the "things" basically manage themselves without any human intervention, thus drastically improving the efficiency thereof.

In today's M2M IoT landscape, especially when it comes to the context of the employment of temperature sensors within dryer systems, such as, a hopper dryer, they are usually installed within the machines within specialized casings so as not to subject them to harsh conditions within the machines. In most of the cases, the sensors are also needed to be installed at specific locations within a machine, and therefore, sometimes, this leads to the necessity of designing the sensors of different sizes and shapes so as to fit into its assigned location seamlessly. Overall, this practice of installing encased sensors within machines, not only increases the cost of the machines, but also makes it difficult to access, replace and maintain them. Further, as wireless signals are incapable of being transmitted through the casing and machine walls, the sensors are physically wired to receivers disposed outside of the machines. This again leads to the increase of cost and limits the proximity of the receivers with respect to the machine, thereby complicating the entire IoT setup. Machine wearable sensors that are easily removably "worn" over the machines may be a solution to the issues of cost and complexity surrounding the IoT. However, physical parameters sensed in a machine wearable sensor is weaker compared to a sensor inserted within a machine or a process and therefore advanced machine learning algorithm is required to extract meaningful intelligence out of the sensor data in the case of machine wearable sensors. It is in this context of mechanical design of sensor housing and interpretation of weak sensor signals using advanced machine learning algorithm, machine wearable sensors create a different paradigm of low cost sensor system.

U.S. Pat. No. 8,726,535 to Garrido et al. discloses a system for controlling heated air drying where, exhaust temperature is measured during drying and compared to a target or ideal exhaust temperature function or reference. Drying factors are adjusted to compensate for the variance between measured exhaust temperature and the target or ideal exhaust temperature function to influence actual exhaust temperature and to follow the target or ideal exhaust temperature function during drying. Drying factors such as inlet air temperature and drying pressure can be controlled manually or automatically by the above comparison to promote efficient and controlled drying. In this prior art invention, although there is a concept of machines fixing machines, i.e., the concept of IoT, the role of machine wearables in the scheme of things is nowhere to be seen.

U.S. Pat. No. 7,938,935 to MacHattie et al. teaches measurement of the condition of paper machine clothing, which involves, by employing Infrared spectroscopy techniques, measuring (i) the moisture level in both the sheet of wet stock and the papermaking machine clothing on which the sheet is supported and (ii) the moisture level in the clothing alone as a separate layer of material. Differential measurement thus yields the moisture content of the sheet of wet stock alone. Changes in the moisture level in the clothing at the press section can be correlated with corresponding changes in the quality or physical property of the paper produced. Notably, both fixed point and scanning IR sensors are strategically positioned in the press section to generate machine direction and/or cross machine direction water profiles for process control. Although the prior art, albeit adapted for a different machine, teaches process control using IR sensors, the concept of employing machine wearables however is non-evident.

U.S. Pub. No. 20070193056 to Switalski discloses a textile dryer capable of monitoring heating chamber temperature (internal thermocouple), peak ink temperature (absorption infrared probe at exit), real-time ink temperature (donut thermocouple) as the textile travels through the chamber, and gas consumption is disclosed. A controller permits one to set numerous parameters and view graphs of the monitored variables over time. Recipes or job settings can be stored for recall and use later. In addition, visual and audible warnings and alarms are incorporated into the system. The prior art also talks about employment of outfeed sensors, which basically is an IR sensor, positioned outside of exit opening above the belt to continuously sense and read the outfeed temperature of an article emerging from the heating chamber of the dryer on the belt. Although the outfeed sensors lie outside of the dryer, they clearly are not machine wearables as they do not sense temperature within the dryer from the outside thereof.

U.S. Pat. No. 5,487,225 to Downie discloses an apparatus for controlled drying of polymer plastic pellets within a dryer hopper. The apparatus comprises a sensor tree having a plurality of temperature sensors spaced vertically on the tree, which is positioned vertically within the dryer hopper so that the individual sensors are each located at varying vertical distances from the bottom to the top of the dryer hopper. A target temperature for a particular type of polymer plastic pellet, when maintained for a specified residence time, indicates that the pellet is thoroughly dry for use in a manufacturing process. By determining the vertical level at which the target temperature has been achieved for the desired residence time, the amount of dry material within the hopper that is ready to be input to the manufacturing process is determined. A signal processing unit operating a software program automatically controls the throughput of the dryer hopper so that only dry polymer plastic pellets leave the hopper. Although some of aspects of this particular prior art seem closer to the present invention, such as, the vertical alignment of sensors, the prior art still doesn't read on the present invention as the sensors of the prior art are disposed within the dryer and thereby are clearly not machine wearables.

It is evident from the discussion of the aforementioned prior art that none of them pave way for the reduction of cost and complexity of M2M IoT systems using the concept of machine wearables. There is need in the art for a solution for the aforementioned problem associated with the sensors especially.

SUMMARY

The present invention aims to solve the aforementioned problems by employing "machine wearable" sensors (which will also be referred to as simply "machine wearables") in lieu of conventional sensors installed within the machine. A machine wearable sensor is advantageously different from a conventional sensor in that, a machine wearable sensor is "worn" over the machine or, in other words, attached to the exterior of the machine. The effectiveness with which data is captured by a machine wearable sensor is no inferior compared to that of conventional sensors. Added to that, machine wearable sensors are readily accessible, thereby making them easier to maintain, replace, etc., which leads to the conclusion that employment of machine wearables leads to significant reduction of cost, complexity of the IoT setup, while not compromising on the "effectiveness" aspect as compared to conventional sensors.

The present invention comprises a hopper dryer comprising an elongate, rectangular, vertically-oriented sight glass. In one embodiment, three vertically-aligned and spaced apart infrared (IR) sensors are mounted to the dryer hopper such that, the IR sensors are positioned to face the sight glass so as to capture the IR radiation passing through the sight glass so as to gauge the temperature within the hopper dryer. The temperature data captured by the IR sensors are, over a Wireless Personal Area Network (WPAN), transmitted to a sensor network.

The sensor network, upon receiving the continuous stream of temperature data, is configured to map the same into a pattern in real-time. Depending on whether the pattern is normal or anomalous, the algorithm engine is configured to generate control commands for the hopper dryer that pertains to either process control or predictive maintenance, or both. The control commands, over the Internet, are transmitted to the hopper dryer, which executes the same resulting in the process control, predictive maintenance, or both.

Other objects and advantages of the embodiments herein will become readily apparent from the following detailed description taken in conjunction with the accompanying drawings.

FIGURES—REFERENCE NUMERALS

Figure 1:
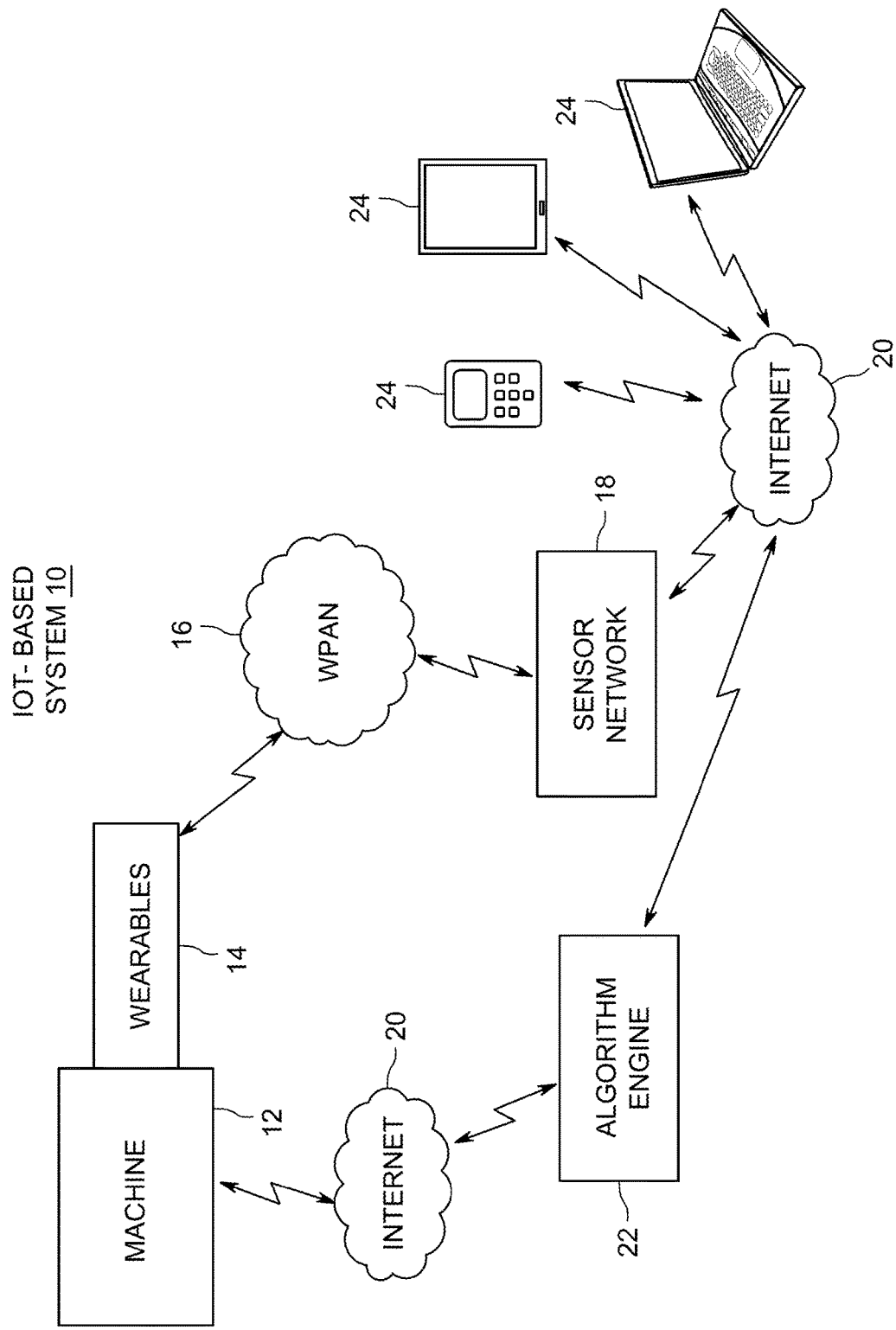
FIG. 1, according to an embodiment of the present invention, is an illustration of a block diagram of the IoT-based system of the present invention.

10—IoT-based System
12—Machine/Hopper Dryer
14—Machine Wearable Sensor/IR Sensor
16—WPAN
18—Sensor Network
20—Internet
22—Algorithm Engine
24—User Terminal
26*f*—First Location
26*s*—Second Location
26*t*—Third Location
28—Mapping Module
30—Database
32—First Relational Module
34—Second Relational Module
36—Command Module

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Referring to FIGS. 1 through 4, the present invention comprises a Machine to Machine (M2M) Internet of Things (IoT)-based system 10 for overseeing process control and predictive maintenance of a machine 12 by employing machine wearable sensors 14 (or simply, "machine wearables"). The machine 12 comprises a conventional hopper dryer 12 comprising a vertically oriented, elongate, rectangular sight glass 13 wherein, the utility of the sight glass 13, aside from the obvious reason of monitoring the dryer 12, will become apparent from the following body of text. The machine wearable sensors 14 comprise wireless infrared (IR) sensors 14, which are easily removably "worn" over or mounted to the exterior of the dryer 12 as opposed to being installed within the dryer 12. More particularly, each IR sensor 14 is magnetically attached or secured to the exterior of the dryer 12. Even more particularly, each IR sensor 14 is encased in a housing, which is embedded or lined with a magnet wherein, the magnet is about which, the housing (including the IR sensor 14) is secured to the exterior of the dryer 12. In one embodiment, the housing is mounted to the dryer 12 by means of commonplace fasteners such as, screws. Notably, each IR sensor 14 is secured to the dryer 12 such that, the IR sensor 14 interfaces with or captures the temperature data from the dryer 12 via the sight glass 13, which allows for the IR radiation within the dryer 12 to pass therethrough. Simply put, each IR sensor is mounted to the dryer 12 such that, the IR sensor 14 is positioned to face the sight glass 13 so as to capture the IR radiation through the sight glass 13. Each IR sensor 14 is powered by a power source (such as, a battery) disposed therewithin. In one embodiment, the power source is rechargeable.

Figure 2:
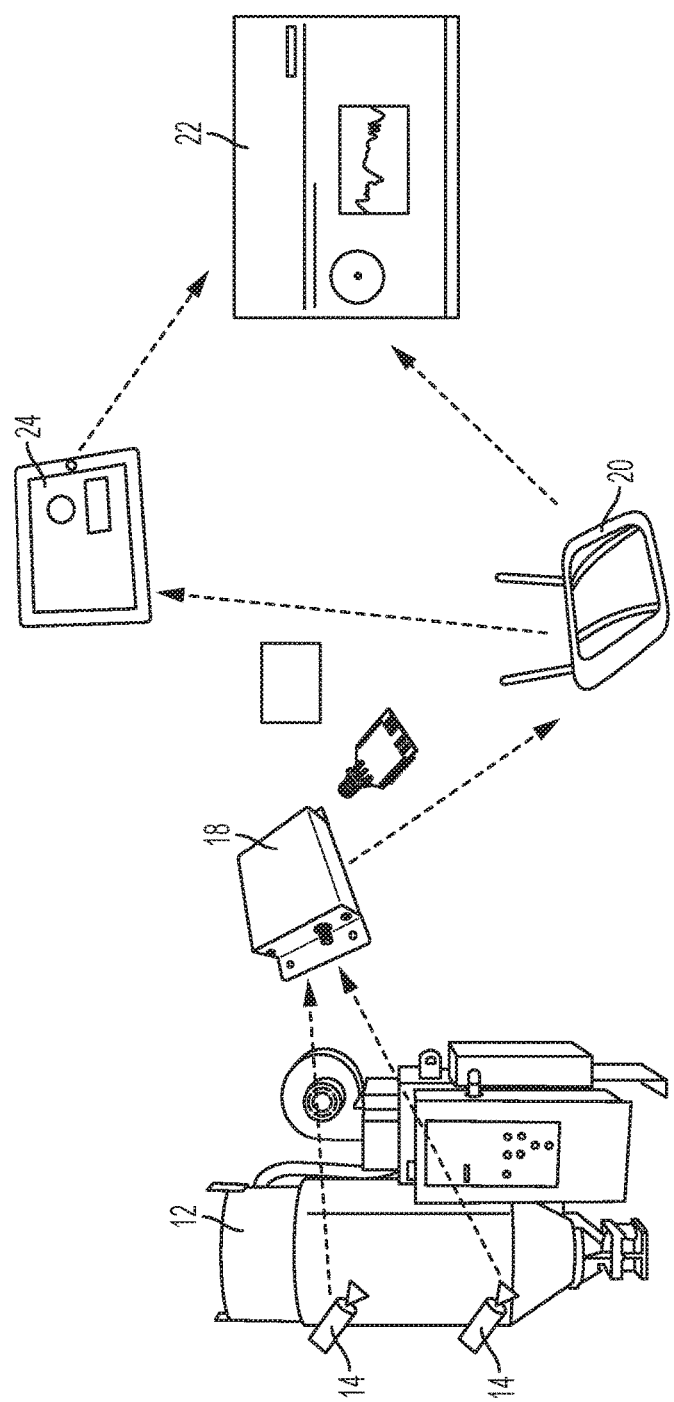
FIG. 2, according to an embodiment of the present invention, is another illustration of a block diagram of the IoT-based system of the present invention.
Figure 3:
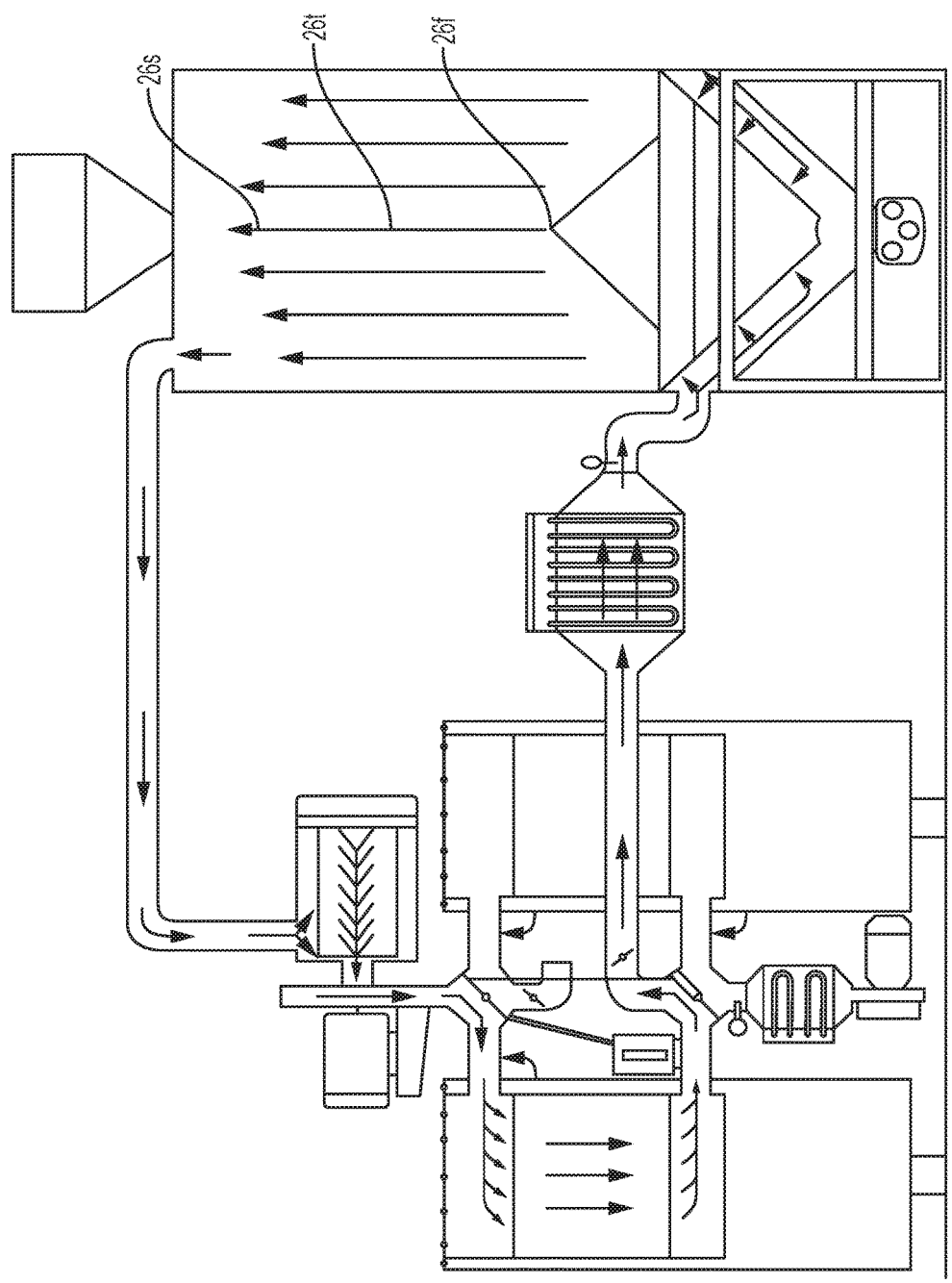
FIG. 3, according to an embodiment of the present invention, is an illustration of an exemplary hopper dryer.

Referring to FIGS. 1 through 3, three IR sensors 14 are employed by the system 10 wherein, the IR sensors 14, while facing or abutting the sight glass 13, are vertically aligned and spaced apart from one another so as to detect temperature values at three vertically-aligned and vertically spaced apart locations within a hopper dryer 12 from the outside thereof via the sight glass 13. As can be appreciated from FIG. 3, the three locations comprise a first location 26F of the inlet of the dry air flow, a second location 26S of the outlet of the flow, and a third location 26T disposed preferably midway between the first and second locations 26F and 26S. Notably, the first location 26S comprises a return hose neck location of the hopper dryer 12. In one embodiment, the plurality of locations comprises two locations viz., a first location 26F of the inlet of the dry air flow and a second location 26S of the outlet of the flow. The IR sensors 14 are not only configured to capture temperature data but also to transmit the captured data over a communications network.

Figure 5:
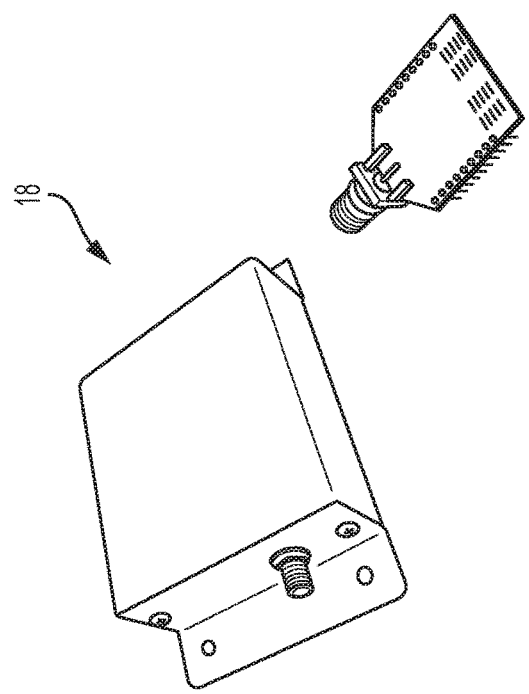
FIG. 5, according to an embodiment of the present invention, is an illustration of a sensor network.
Figure 4:
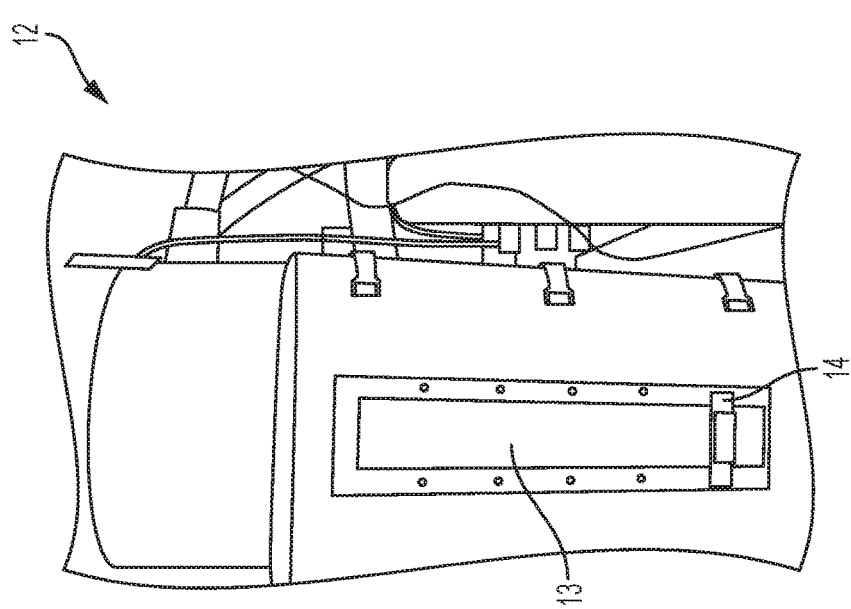
FIG. 4, according to an embodiment of the present invention, is an illustration of a hopper dryer mounted with a machine wearable IR sensor.

Referring to FIGS. 1, 2 and 5, the system 10 further comprises a sensor network 18 wherein, the sensor network 18 is disposed in operative communication with the IR sensors 14 over a communications network. More particularly, the sensor network 18, which preferably comprises a ZigBee Master®, is configured to incessantly receive the temperature data from the IR sensors 14 in real-time. More particularly, the communications network over which, the data is transmitted from the IR sensors 14 to the sensor network 18 comprises a Wireless Personal Area Network (WPAN) 16, which preferably comprises ZigBee®. The sensor network 18, apart from receiving the continuous stream of temperature data, is also configured to continuously transmit the same over a wider communications network, viz., the Internet 20, for further processing, which will become apparent from the following body of text.

Referring to FIGS. 1 and 2, the system 10 further comprises an algorithm engine 22, which as can appreciated from the referred drawings, is disposed in operative communication with the sensor network 18, user terminals 24, and the machine 12 preferably over the Internet 20. The algorithm engine 22 is preferably run by one or more relational database algorithms, the utility of which will become apparent from the following body of text. Further, in one embodiment, the algorithms run by the algorithm engine 22 are of machine learning nature. The algorithm engine 22 preferably comprises a distributed Big Data system such as, Hadoop, Storm or Spark. The algorithm engine 22 is configured to receive the stream of data transmitted by the sensor network 18 for further processing to generate control commands that pertain to either process control or predictive maintenance, or both.

Figure 6:
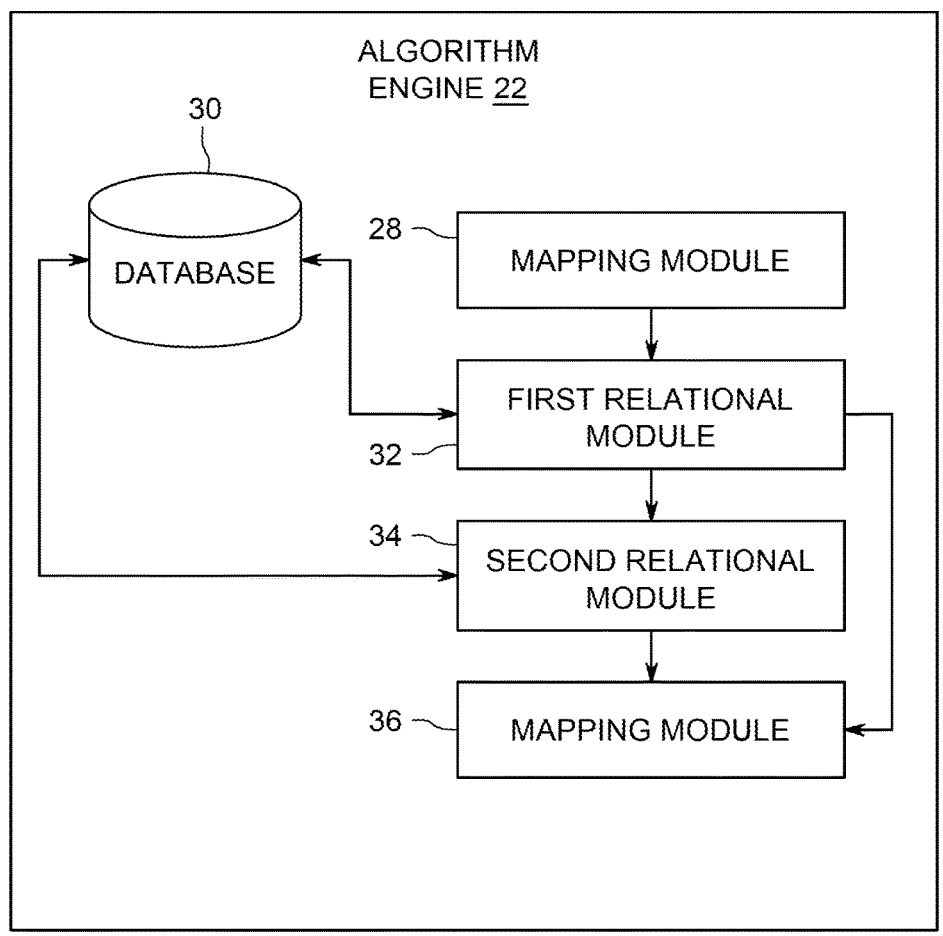
FIG. 6, according to an embodiment of the present invention, is an illustration of a block diagram of the algorithm engine.
Figure 7A:
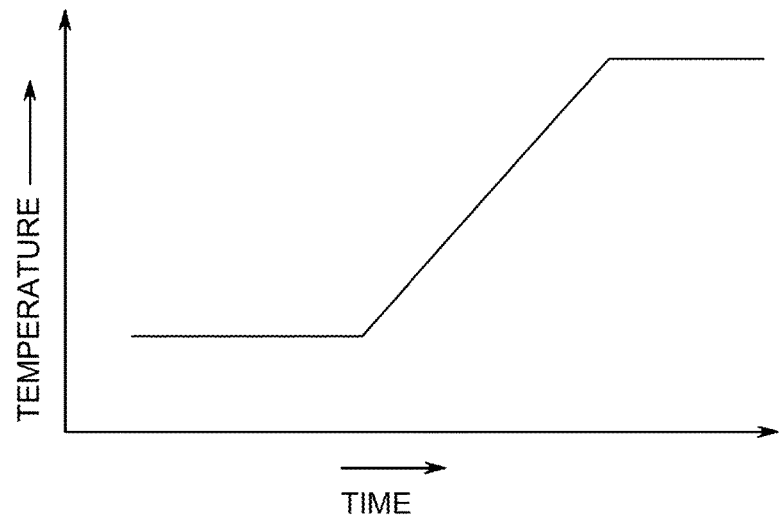
FIGS. 7A and 7B, according to an embodiment of the present invention, are maps representing normalcy and anomaly respectively.
Figure 7B:
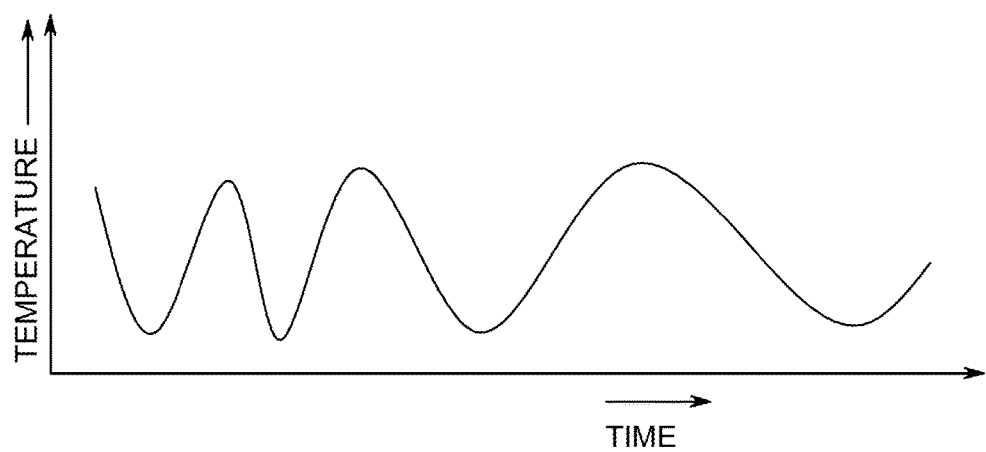

Referring to FIGS. 1, 2, and 6, the algorithm engine 22 comprises a mapping module 28, a database 30, a first relational module 32, a second relational module 34, and a command module 36. The algorithm engine 22, upon receiving the stream of real-time data from the sensor network 18, is initially received by the mapping module 28, which performs a real-time mapping or pictorially patterning the same using a machine learning algorithm. The database 30 comprises one or more normal temperature patterns (or maps) wherein, each normal pattern is associated with one or more control commands. An exemplary normal pattern is represented by the graph in FIG. 7A. The database 30 also comprises one or more anomalous temperature patterns, wherein, each anomalous pattern is an indication of a malfunction of the machine. Examples of such malfunctions include overheating, clogged filters, motor malfunctioning, etc. An exemplary anomalous pattern is represented by the graph in FIG. 7B. Further, each anomalous pattern within the database 30 is associated with one or more control commands, the utility of which will become apparent from the following body of text.

Still referring to FIGS. 1, 2, and 6, upon mapping the real-time temperature data, the pattern of the real-time data is received by the first relational module 32, which is configured to compare the same against the normal patterns in the database 30. Upon finding a match as enabled by relational database algorithm, the corresponding control commands (if applicable) are transmitted to the control panel of the machine as enabled by the command module 36 over a communications network, preferably the Internet 20. The control panel of the machine 12, upon receiving the control commands, executes the same resulting in the process control of the machine 12. On the other hand, if no match is found by the first relational module 32, meaning that the real-time pattern is an anomalous pattern, the real-time pattern is received by the second relational module 34, which compares the same against the anomalous patterns in the database 30. Upon finding a match, as enabled by relational database algorithm, the corresponding control commands are transmitted to the control panel of the machine 12 as enabled by the command module 36 over the Internet 20. The control panel, upon receiving the control commands, executes the same, resulting in the preventive maintenance of the machine 12.

Referring to FIGS. 1 and 2, the system 10 further comprises a monitoring module disposed in operative communication with the algorithm engine 22 wherein, the monitoring module, which basically comprises a computer application, is accessible from a remote user terminal 24 over the Internet 20. The user terminal 24 could be a smartphone, a tablet PC, a laptop, or the like. The monitoring module enables the users to monitor the system 10 from remote locations via the user interface of the user terminal 24. The monitoring module is configured to display the pictorial representation of the data received by the algorithm engine 22 in real-time and also the control commands transmitted by the algorithm engine 22 in response to the received data.

The aforementioned embodiments are able to be implemented, for example, using a machine-readable medium or article which is able to store an instruction or a set of instructions that, if executed by a machine, cause the machine to perform a method and/or operations described herein. Such machine is able to include, for example, any suitable processing platform, computing platform, computing device, processing device, electronic device, electronic system, computing system, processing system, computer, processor, or the like, and is able to be implemented using any suitable combination of hardware and/or software. The machine-readable medium or article is able to include, for example, any suitable type of memory unit, memory device, memory article, memory medium, storage device, storage article, storage medium and/or storage unit; for example, memory, removable or non-removable media, erasable or non-erasable media, writeable or re-writeable media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions is able to include any suitable type of code, for example, source code, compiled code, interpreted code, executable code, static code, dynamic code, or the like, and is able to be implemented using any suitable high-level, low-level, object-oriented, visual, compiled and/or interpreted programming language, e.g., C, C++, Java, BASIC, Pascal, Fortran, Cobol, assembly language, machine code, or the like. Functions, operations, components and/or features described herein with reference to one or more embodiments, is able to be combined with, or is able to be utilized in combination with, one or more other functions, operations, components and/or features described herein with reference to one or more other embodiments, or vice versa.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Figure 8:
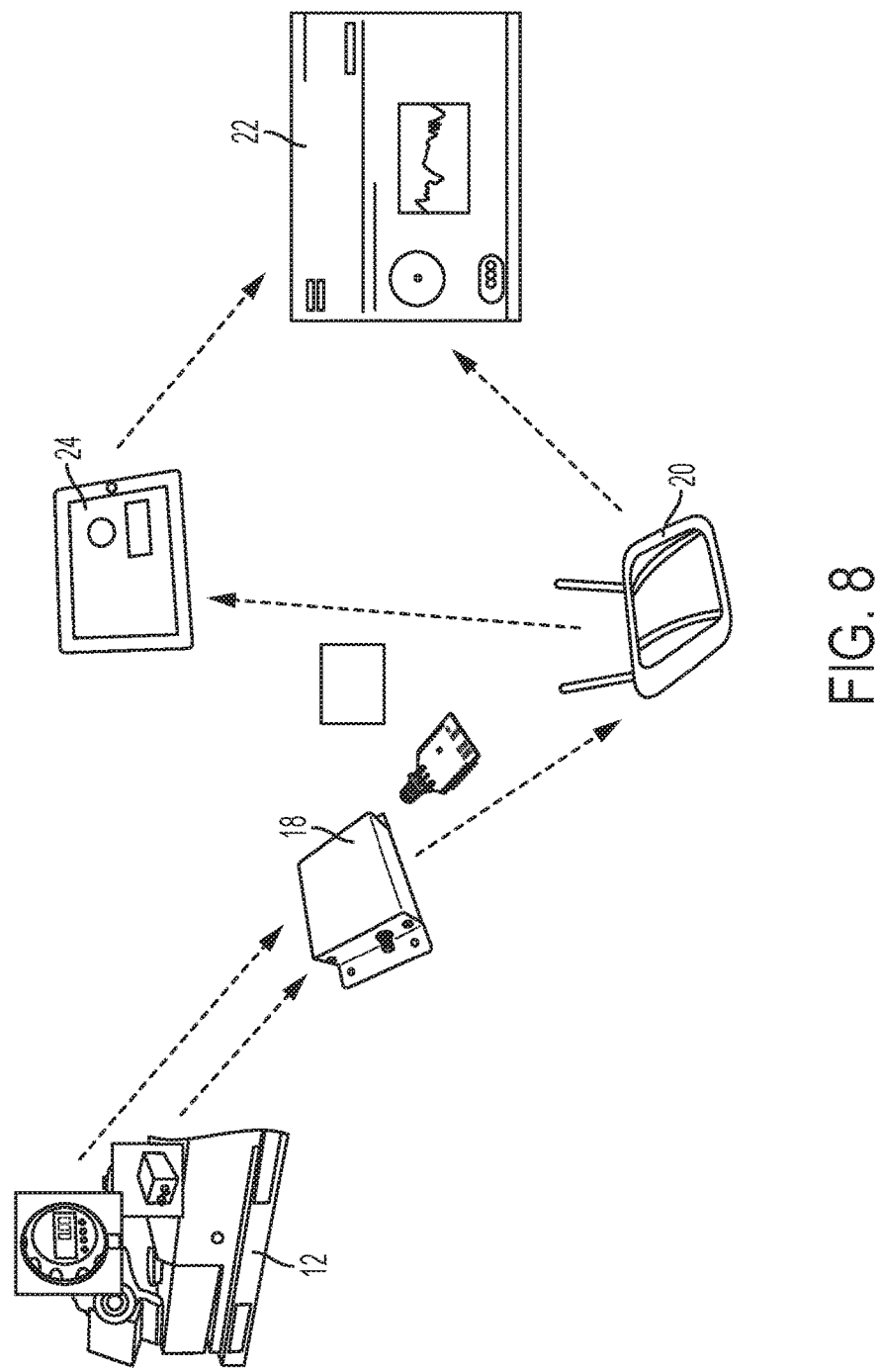
FIG. 8, according to an alternate embodiment of the present invention, is another illustration of a block diagram of the IoT-based system of the present invention.

Although the embodiments herein are described with various specific embodiments, it will be obvious for a person skilled in the art to practice the invention with modifications. For example, the machine could be any machine that is capable of being controlled remotely. In one embodiment, as shown in FIG. 8, the machine comprises a pump that employs wearable temperature and pressure sensors as the hopper dryer employed temperature sensors. However, all such modifications are deemed to be within the scope of the claims.

What is claimed is:

1. An Internet of Things (IoT) based system for overseeing process control and predictive maintenance of a machine by employing machine wearable sensors, comprising:
   a. a plurality of machine-wearable infrared (IR) temperature sensors, each of which being secured to the exterior of the machine; each IR sensor transmitting captured temperature data wirelessly over a communications network;
   b. an algorithm engine capable of receiving data from the IR sensors, the algorithm engine further processing the received data to recognize real-time temperature pattern deviations, and based on the same and, at times, in combination with other factors, promptly issuing control commands pertaining to the machine; and
   c. a control module disposed in operative communication with a control panel of the machine, the control module receiving over a communications network the control commands and executing the same resulting in process control or predictive maintenance of the machine or both;

wherein the machine comprises a hopper dryer comprising an elongate, vertical sight glass; the plurality of infrared (IR) temperature sensors being secured over the sight glass for capturing the IR radiation therethrough, each of the plurality of IR sensors being vertically disposed over one another, each IR sensor capturing temperature within the hopper dryer at the vertical level thereof.

2. The system of claim 1 wherein each IR sensor is magnetically secured to the hopper dryer.

3. The system of claim 2 wherein each IR sensor is encased within a holder comprising a magnet; the magnet within which, the IR sensor is encased being attached to the hopper dryer.

4. The system of claim 1 wherein each IR sensor is secured to the hopper dryer by a screw mounting.

5. The system of claim 1 wherein the plurality of IR sensors comprises two IR sensors.

6. The system of claim 1 wherein the plurality of IR sensors comprises three IR sensors.

7. The system of claim 6 wherein a first IR sensor is located at a dry air flow inlet of the machine, a second IR sensor is located at an air flow outlet of the machine, and a third IR sensor is located between the first and second locations.

8. The system of claim 1 wherein the plurality of IR sensors are vertically spaced-apart from one another.

9. An Internet of Things (IoT) based system for overseeing process control and predictive maintenance of a machine by employing machine wearable sensors, comprising:
   a. a plurality of machine-wearable infrared (IR) temperature sensors, each of which secured to the exterior of the machine; each IR sensor transmitting captured temperature data wirelessly over a communications network;
   b. an algorithm engine receiving data from the IR sensors, the algorithm engine further processing the received data to recognize real-time temperature pattern deviations, and based on the same and, at times, in combination with other factors, promptly issuing control commands pertaining to the machine; and
   c. a control module disposed in operative communication with a control panel of the machine, the control module receiving, over a communications network the control commands and executing the same resulting in process control or predictive maintenance of the machine or both;

wherein the algorithm engine comprises:
- (i) a database comprising at least one anomalous temperature pattern, each of which is associated with a control command;
- (ii) a mapping module for mapping received temperature data into a real-time temperature pattern;
- (iii) a first relational module for comparing the real-time temperature pattern against one or more normal temperature patterns;
- (iv) a second relational module for comparing the real-time temperature pattern against the at least one anomalous temperature pattern in the event of the real-time temperature pattern is not matched with any of the one or more normal temperature patterns; and
- (v) the command module issuing a corresponding control command upon recognizing an anomalous temperature pattern with which the real-time temperature pattern matches.

* * * * *